G. E. PLETCHER.
TOPPING MACHINE.
APPLICATION FILED NOV. 22, 1920.
1,413,774.
Patented Apr. 25, 1922.
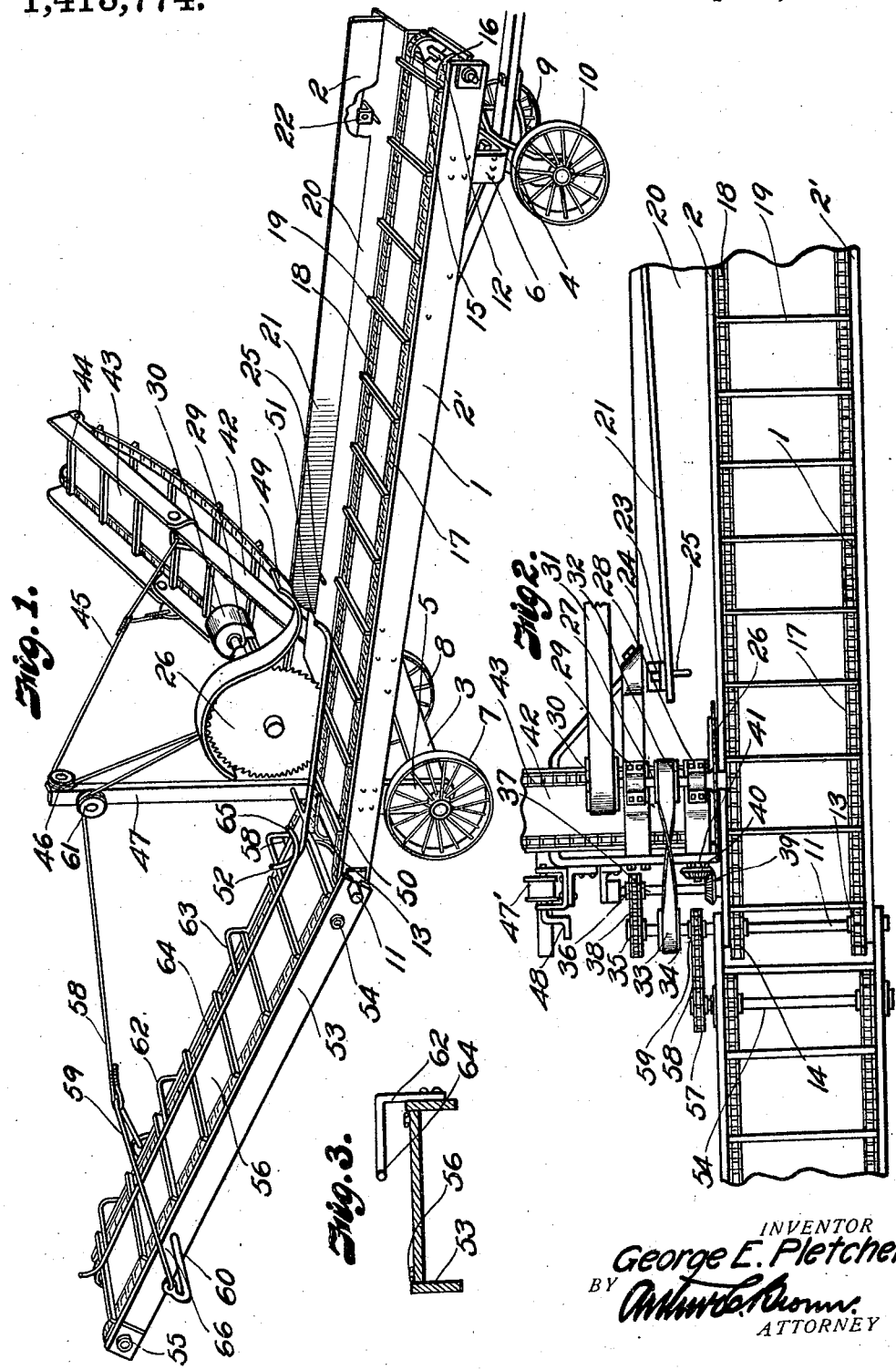
INVENTOR
George E. Pletcher.
BY
ATTORNEY

UNITED STATES PATENT OFFICE.

GEORGE E. PLETCHER, OF PERRYTOWN, TEXAS.

TOPPING MACHINE.

1,413,774.  Specification of Letters Patent.  Patented Apr. 25, 1922.

Application filed November 22, 1920. Serial No. 425,690.

*To all whom it may concern:*

Be it known that I, GEORGE E. PLETCHER, a citizen of the United States, residing at Perrytown, in the county of Ochiltree and State of Texas, have invented certain new and useful Improvements in Topping Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to topping machines adapted for severing the heads from the stalks of Kaffir corn, milo maize and the like, and the invention contemplates the provision of means whereby the stalks may be conveniently carried to a severing device where the heads will be separated from the stalks and conveyed to an appropriate point, for example, a thresher or the like, the stalks being separately conveyed to another convenient point as, for example, a wagon or dump.

It is the purpose of my invention to provide a simple, durable and efficient device which is readily portable and which will perform the functions for which it is intended in an efficient and expeditious manner.

In carrying out my invention I provide a portable, horizontal conveyor, on the frame of which is a gauge rail so that the heads and stalks may be straightened up preparatory to presentation to the severing device, there being also preferably provided a guard rail under which the heads of the stalks are fed so that they may be properly presented to the severing device.

A conveyor is also provided in close proximity to the severing device so that the heads may be carried away therefrom as soon as they are separated from the stalks and delivered to a suitable receiving means as, for example, a thresher, the stalks being carried to another point by a separate conveyor. The last named conveyor is provided with a guard under which the stalks pass on their passage away from the severing device, the latter guard being provided to eliminate the liability of the stalks becoming spilled from the conveyor.

Certain other novel parts and combinations of parts will be described hereinafter, reference being had to the accompanying drawings, in which—

Fig. 1 is a perspective view of a topping machine constructed in accordance with my invention.

Fig. 2 is a fragmentary, plan view of the same, and

Fig. 3 is a cross sectional view on the line 3—3 of Fig. 1.

In the illustrated embodiment of my invention 1 designates an elongated frame, consisting of the side bars 2 and 2′, which may be connected by suitable cross bars or struts in a well known manner. The frame is supported upon axles 3 and 4 by bolsters 5 and 6, the axles having mounted thereon ground wheels 7, 8, 9 and 10 so that the frame is in the form of a vehicle. At the respective ends of the frame are conveyor driving shafts 11 and 12, which carry sprockets 13 and 14 on shaft 11 and 15 and 16 on shaft 12. A sprocket chain 17 passes around the sprockets 13 and 16 and a complementary sprocket chain 18 passes around the sprockets 14 and 15, the sprocket chain being connected by slats 19 to provide a conveyor between the side bars 2 and 2′, as clearly illustrated in Figs. 1 and 2.

One of the side bars, for example, the one designated 2, carries a laterally, outwardly projecting shelf or table 20, which may be secured thereto in any appropriate manner, and said shelf carries a gauge rail 21, set on edge and pivoted at the front end of the machine by a pivot device 22, which may be of any preferred construction.

At the other or free end of the gauge rail 21 is an angle 23, the lateral flange 24 of which carries a bolt having a nut thereon and movable in the lateral slot 25. Therefore, it will be apparent that the gauge rail may be swung toward and away from the conveyor to accommodate for long heads and short heads, and thereby insure the proper presentation of the stalks to the severing device, shown as a disk saw 26 rotatable vertically at the rear end of the conveyor frame. The shaft 27 of the saw is mounted in bearings 28 and 29 supported by the main frame and on one end of the shaft 27 is a pulley 30, adapted to be driven by a suitable belt 31, which, in turn, may be driven from any suitable source.

Intermediate the ends of the shaft 27 is a pulley 32, from which is driven a belt 33, passing around the pulley 34 on the shaft 11 so that the conveyor and the saw will be simultaneously driven.

The end of the shaft 11 carries a sprocket 35 which drives a sprocket 36 on a counter shaft 37, through the medium of a sprocket chain 38, the counter shaft carries a beveled gear 39 which meshes with a beveled gear 40 on shaft 41, transverse of a second conveyor frame 42, extending at right angles to the main conveyor and pivoted to the frame thereof below the saw so that the heads which have been severed by the saw will drop upon the endless belt 43 and be discharged from the upper end 44 to a thresher or to some other suitable means for receiving them.

The conveyor frame 42 may be raised and lowered by the cable 45 which passes around a pulley 46 on a standard 47 carried by the main frame, the end of the cable being adapted to pass around a drum 47' provided with a crank 48 and preferably with a pawl and ratchet mechanism so that the pawl will act as a detent to hold the conveyor 42 in any inclined position, the detail construction of the drum being so well known that it is deemed unnecessary to specifically illustrate or describe it in this application.

If desired, the saw may be provided with a guard 49 extending over the top thereof, as shown in Fig. 1, the guard being appropriately secured to the main frame.

In order to insure the heads being efficiently severed from the stalks I have provided a longitudinal guard consisting of a bar 50 in front of the saw and extending a suitable distance longitudinally of the main conveyor, the front end of the bar being upturned as at 51 so that the stalks will be fed beneath the same and will be held against the conveyor, as the heads are presented to the saw. This prevents the saw from spreading the heads or tearing them and provides for a more efficient separation.

The rear end of the guard bar 50 is upturned, as at 52 and extends beyond the main conveyor to overlap a supplemental aligning conveyor supported by a frame 53, pivoted to the main conveyor frame and having transverse conveyor shafts 54 and 55 which drive a conveyor belt 56. The conveyor shaft 54 carries a sprocket 57 driven by a chain 58 from a sprocket 59 on the shaft 11.

The conveyor frame 53 may be raised and lowered by a cable 58 having a loop 59, which is connected to the upturned ends of a U-shaped bar 60, transversely slidable through the frame 53. The end of the cable passes over a pulley 61 on the standards 47, which is also adapted to be wound by a suitable drum or held by any other suitable means so as to provide for the proper elevation of the conveyor frame 53. The conveyor frame 53 carries transverse arms 62 and 63 which support a guard bar 64, which has an upturned end 65 overlapping the upturned end 52 of the bar 50 so that as the stalks leave the guard 50, they will pass under the guard bar 64 as they are conveyed by the conveyor belt 56. The purpose of having the guard bar 64 is to prevent the stalks from tilting off the conveyor for since the forward ends of the stalks can only slightly overlap the conveyor belt to provide for the proper separation of the heads, relatively long stalks would have a tendency to tilt off the conveyor belt 56 but this will be prevented by the guard 64. The rod or bar 60 is made relatively long so that in the event that the stalks are relatively long they may pass through the space 66 formed by the loop 59 and the bar 60. As they leave the conveyor, they may be received in a wagon or be dumped upon a pile to be later removed.

It will be apparent from the foregoing that the device is easily portable, that it is simple in operation, and that it will efficiently separate the heads from the stalks, automatically conveying the heads to the thresher or other receptacle and the stalks to the desired point.

By providing the gauge rail 21, the bundles of stalks may be lined up so that the heads of all of the stalks will be severed at the proper points when they reach the saw.

The purpose of providing for adjustability of the conveyor frames 42 and 53 will be apparent when it is understood that the heights of the points to receive both the severed heads and the stalks may vary under varying conditions and it is desirable to adjust the conveyors to meet these requirements.

The arrangement of driving mechanism has been conveniently arranged and will lend itself for the purpose intended although I do not wish to be limited in every case to the specific arrangement of driving mechanism shown.

What I claim and desire to secure by Letters-Patent is:

1. A head topping machine for Kaffir corn and the like comprising a horizontal conveyor, a gage rail along one edge thereof, a head severing saw at one end of the conveyor, a rail in front of the saw and above the conveyor, an aligning conveyor in pivoted relation to the first named conveyor, and an anti-tilting stalk rail above the aligning conveyor.

2. In a topping machine for Kaffir corn and the like, a horizontal conveyor, a head severing saw at one end of the conveyor, a guard rail in front of the saw and above the conveyor, an aligning conveyor connected to the first, and an anti-stalk tilting guard rail above the second conveyor.

In testimony whereof I affix my signature.

GEORGE E. PLETCHER.